United States Patent
Lin

(10) Patent No.: US 8,315,114 B2
(45) Date of Patent: Nov. 20, 2012

(54) MEMORY CONTROLLERS

(75) Inventor: Chuan Lin, Beijing (CN)

(73) Assignee: Vimicro Corporation, Beijing (CN)

( * ) Notice: Subject to any disclaimer, the term of this patent is extended or adjusted under 35 U.S.C. 154(b) by 378 days.

(21) Appl. No.: 12/786,776

(22) Filed: May 25, 2010

(65) Prior Publication Data

US 2010/0306459 A1 Dec. 2, 2010

(51) Int. Cl.
*G11C 7/00* (2006.01)
(52) U.S. Cl. .......... 365/193; 365/233.11; 365/233.13
(58) Field of Classification Search .......... 365/193, 365/154, 233.11
See application file for complete search history.

(56) References Cited

U.S. PATENT DOCUMENTS

| 7,685,393 B2 * | 3/2010 | Gillingham et al. .......... 711/167 |
| 7,965,568 B2 * | 6/2011 | Ushikoshi et al. ............ 365/201 |
| 2007/0002642 A1 * | 1/2007 | Butt et al. ...................... 365/193 |

* cited by examiner

*Primary Examiner* — Huan Hoang
(74) *Attorney, Agent, or Firm* — Joe Zheng; Wuxi SinoIPs Agency, Ltd

(57) ABSTRACT

Techniques pertaining the designs of memory controller are disclosed. According to one aspect of the present invention, a memory controller reduces delays in a data strobe signal of a DDR memory relative to a clock signal of a memory controller thereof. In one embodiment, the memory controller employs four IO ports, two inverters, six edge triggers and a multiplexer. By feeding back an inverted clock signal and utilizing the rising and filing edges of the clock signal, the delays in a data strobe signal of a DDR memory relative to a clock signal of a memory controller are considerably reduced or minimized.

16 Claims, 3 Drawing Sheets

MEMORY CONTROLLERS

BACKGROUND OF THE INVENTION

1. Field of the Invention

The present invention relates to the area of memory controller, more particularly, related to a double data rate (DDR) synchronous dynamic random access memory (SDRAM) controller.

2. Description of Related Art

DDR SDRAM (called as DDR memory herein) as a high-capacity, high-density and high-speed memory has been widely used in various chips. Main difference between the DDR memory and a previous generation SDRAM (called as SDRAM herein) is that the DDR memory can transfer data at the rising and falling edge of the clock, but the SDRAM only can transfer data at the rising edge of the clock. Furthermore, a clock frequency of the DDR memory is from 133 MHz to 200 MHz, but a clock frequency of the SDRAM is lower than 133 MHz.

High-speed clock and faster data transfer rate make a DDR memory controller more difficult in design. A delay difference of a data strobe signal DQS of the DDR memory relative to a clock signal DCLK of the DDR memory controller may be more than 5 ns when the DDR memory works at a maximum working temperature (125 degree Celsius) and a minimum working temperature (−40 degree Celsius) respectively.

FIG. 1 is a circuit diagram schematically showing a conventional DDR memory controller connected with a DDR memory.

The DDR memory controller includes a number of IO ports. Each IO port has a tri-state terminal PAD interacting with the DDR memory. When the IO port is used as an output port, an input signal of a terminal I of the IO port is outputted via the tri-state terminal PAD. When the IO port is used as an input port, an output signal of a terminal C of the IO port is inputted from the tri-state terminal PAD. The DDR memory controller includes a pair of edge triggers (e.g. D flip-flops) DFF1 and DFF2 and an inverter INV. Each edge trigger has a clock terminal CK, an input terminal D and an output terminal Q.

A clock signal DCLK of the DDR memory controller is provided to the inverter INV that inverts the clock signal DCLK and outputs an inverted clock signal INV_DCLK to the terminal I of the IO port IO1. The IO port IO1 outputs the inverted clock signal INV_DCLK to a clock terminal CK of the DDR memory via the tri-state terminal PAD thereof.

A data strobe terminal DQS of the DDR memory is coupled to the tri-state terminal PAD of the IO port IO3. The terminal C of the IO port IO3 is coupled to the clock terminal CK of the edge trigger DFF1. A data terminal DQn of the DDR memory is couple to the tri-state terminal PAD of the IO port IO2. The terminal C of the IO port IO2 is coupled to the input terminal D of the edge trigger DFF1. The edge trigger DFF1 is provided to sample the read data DQn on the falling edge and/or the rising edge of the data strobe DQS' inputted from the data strobe terminal DQS and output the sampled read data DQ_S1 via the output terminal Q thereof.

The clock terminal CK of the edge trigger DFF2 is coupled to the clock signal DCLK of the DDR memory controller, and the input terminal D of the edge trigger DFF2 is couple to the output terminal Q of the edge trigger DFF1. The edge trigger DFF2 is provided to sample the read data DQ_S1 on the falling edge and/or the rising edge of the clock signal DCLK and output the sampled read data DQ_S2 via the output terminal Q thereof.

It can be seen that the read data DQ_S1 is obtained by using the data strobe DQS' as the sampling clock, and the data DQ_S2 is obtained by sampling the read data DQ_S1 according to the clock signal DCLK. The delay of the clock signal DQS' relative to the clock signal DCLK is caused by:

an output delay Tpat_out of the IO port, which is often 4.5 ns at the maximum working temperature and 2.5 ns at the minimum working temperature;

an accessing time Tac of the DDR memory, which is often 5 ns at the maximum working temperature and 2 ns at the minimum working temperature;

an input delay Tpat_in of the IO port, which is often 2.5 ns at the maximum working temperature and 1.5 ns at the minimum working temperature; and an inverting delay $T_{INV}$ of the inverter INV, which is half of cycle of the clock signal.

The above delays are taken as examples for explanation and not all delays are taken into consideration. In practice, other factors may also affect the delay of the data strobe DQS' relative to the clock signal DCLK. Hence, a certain design margin should be considered.

It is assumed that the clock frequency of the clock signal DCLK is 166 MHz, the delay of the data strobe DQS' relative to the clock signal DCLK is about 15 ns at the maximum working temperature, and the delay of the clock signal DQS' relative to the clock signal DCLK is about 9 ns at the maximum working temperature. The delay difference of the data strobe DQS' relative to the clock signal DCLK of the DDR memory controller may be more than 6 ns at the maximum working temperature and the minimum working temperature. As a result, the DDR memory controller obtains the valid read data DQ_S2 in the difference clock cycles at the maximum working temperature and the minimum working temperature. It has to employ extra software to control the data read operation of the DDR memory controller according to a current working temperature. Thus, a burden of center processing unit is increased, an extra temperature detector is needed, and a reliability of read data is reduced.

Thus, improved techniques for memory controller are desired to overcome the above disadvantages.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention is related to designs of memory controller. According to one aspect of the present invention, a memory controller reduces delays in a data strobe signal of a DDR memory relative to a clock signal of a memory controller thereof. In one embodiment, the memory controller employs four IO ports, two inverters, six edge triggers and a multiplexer. By feeding back an inverted clock signal and utilizing the rising and filing edges of the clock signal, the delays in a data strobe signal of a DDR memory relative to a clock signal of a memory controller are considerably reduced or minimized.

Many objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

The detailed description of the present invention is presented largely in terms of procedures, steps, logic blocks, processing, or other symbolic representations that directly or indirectly resemble the operations of devices or systems contemplated in the present invention. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams or the use of sequence numbers representing one or more embodiments of the invention do not inherently indicate any particular order nor imply any limitations in the invention.

Figure 1:
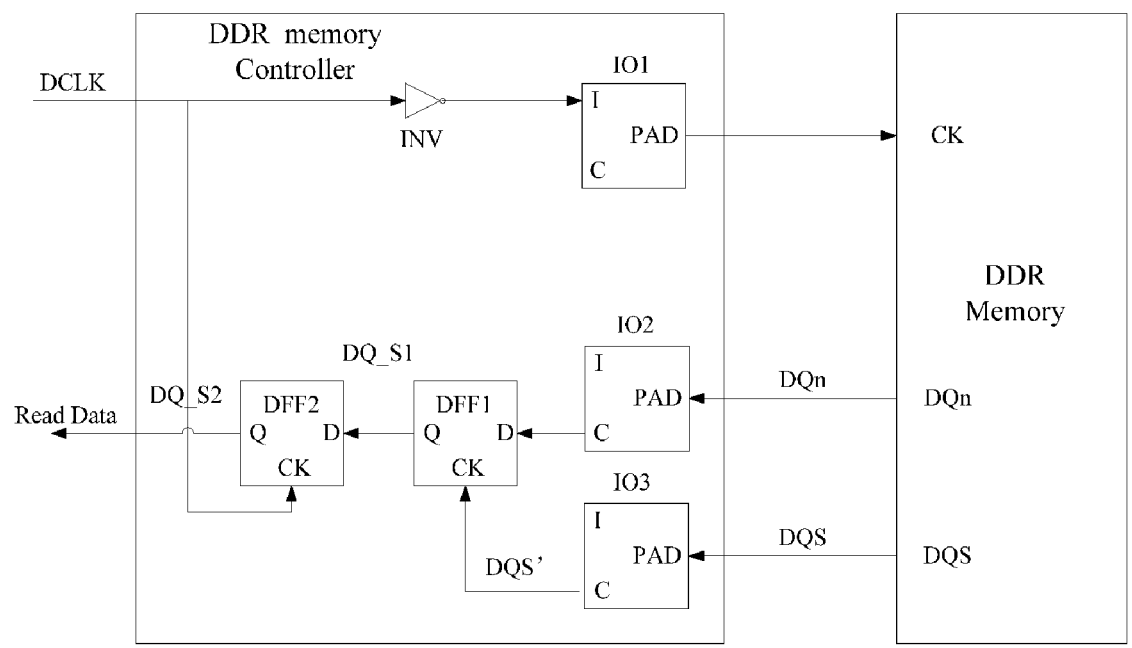
FIG. 1 is a circuit diagram schematically showing a conventional DDR memory controller connected with a DDR memory.
Figure 2:
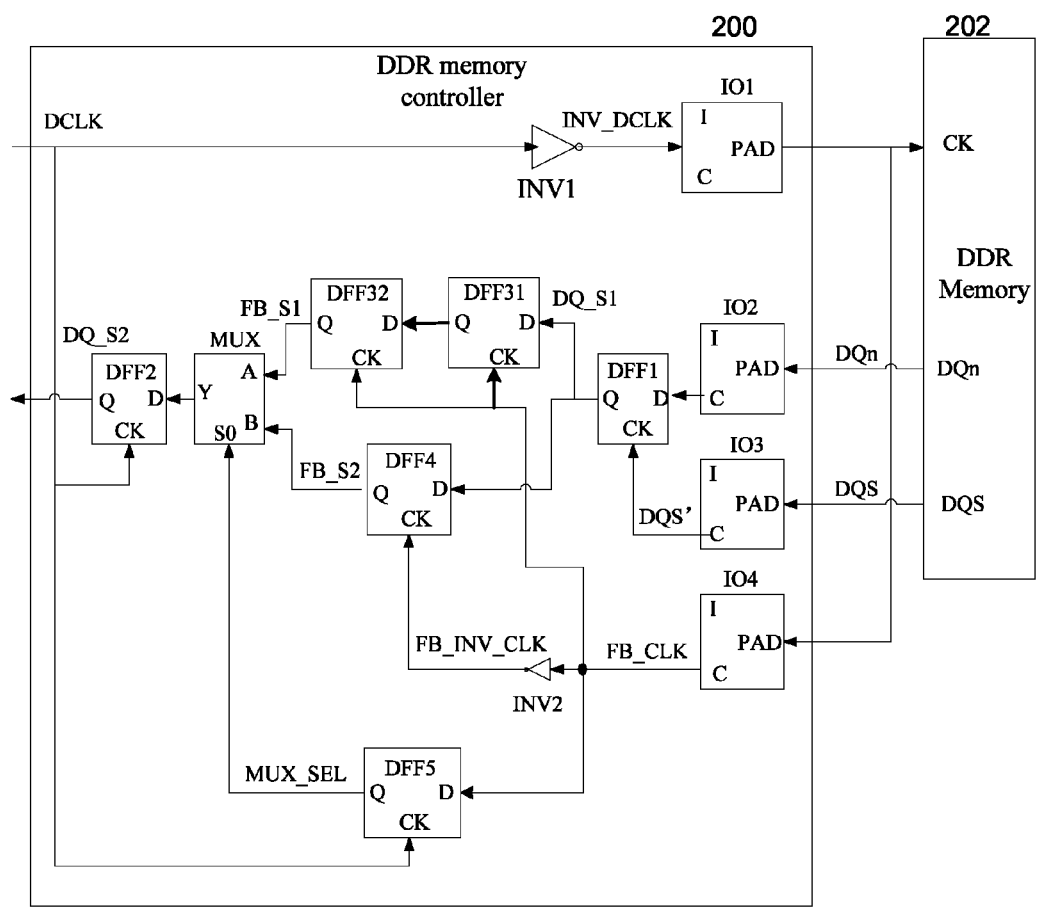
FIG. 2 is a circuit diagram schematically showing a DDR memory controller connected with a DDR memory according to one embodiment of the present invention.

Embodiments of the present invention are discussed herein with reference to FIGS. 1-3. However, those skilled in the art will readily appreciate that the detailed description given herein with respect to these figures is for explanatory purposes only as the invention extends beyond these limited embodiments.

FIG. 2 is a circuit diagram schematically showing a DDR memory controller 200 coupled to a DDR memory 202 according to one embodiment of the present invention. The DDR memory controller 200 comprises four IO ports IO1, IO2 IO3 and IO4, two inverters INV1 and INV2, six edge triggers DFF1, DFF2, DFF31, DFF32, DFF4 and DFF5 and a multiplexer MUX. Each edge trigger has an input terminal D, an output terminal Q and a clock terminal CK. The multiplexer MUX has a pair of input terminals A and B, an output terminal Y and a control terminal S0.

A clock signal DCLK of the DDR memory controller 200 is provided to the inverter INV1. The inverter INV1 inverts the clock signal DCLK and outputs an inverted clock signal INV_DCLK to a clock terminal CK of the DDR memory 202 via the IO port IO1.

A data strobe DQS of the DDR memory 202 is provided to the clock terminal CK of the edge trigger DFF1 via the IO port IO3. A read data DQn of the DDR memory 202 is provided to the input terminal D of the edge trigger DFF1. The output terminal Q of the edge trigger DFF1 is coupled to the input terminals D of the edge triggers DFF31 and DFF4. The edge trigger DFF1 is provided to sample the read data DQn on the falling edge and/or the rising edge of the data strobe DQS' and output the sampled read data DQ_S1 to the edge triggers DFF31 and DFF4.

The clock signal provided to the DDR memory 202 is fed back to the DDR memory controller 200 via the IO port 104. The clock signal FB_CLK fed back to the DDR memory controller 200 is coupled to the clock terminals CK of the edge triggers DFF32 and DFF31, and the input terminal D of the edge triggers DDF5. The inverter INV2 inverts the clock signal FB_CLK and outputs an inverted clock signal FB_INV_CLK to the clock terminal CK of the edge trigger DFF4.

The edge trigger DFF31 is provided to sample the read data DQ_S1 on the falling edge and/or the rising edge of the clock signal FB_CLK and output the sampled read data to the edge trigger DFF32. The edge trigger DFF32 is provided to sample the data outputted from the edge trigger DFF31 on the falling edge and/or the rising edge of the clock signal FB_CLK and output the sampled read data FB_S1 to the input terminal A of the multiplexer MUX. The edge trigger DFF4 is provided to sample the read data DQ_S1 on the falling edge and/or the rising edge of the clock signal FB_INV_CLK and output the sampled read data FB_S2 to the input terminal B of the multiplexer MUX.

The clock signal DCLK is coupled to the clock terminal CK of the edge trigger DFF5. The output terminal Q of the edge trigger DFF5 is coupled to the control terminal S0 of the multiplexer MUX. The edge trigger DFF5 is provided to sample the clock signal FB_CLK on the falling edge and/or the rising edge of the clock signal DCLK and output a control signal MUX_SEL to the control terminal S0 of the multiplexer MUX.

The output terminal Y of the multiplexer MUX is coupled to the input terminal D of the edge trigger DFF2. The multiplexer MUX is provided to output one of the read data FB_S1 and the read data FB_S2 to the edge trigger DFF2 according to the control signal MUX_SEL from the edge trigger DFF5. For example, when S0=1, the multiplexer MUX outputs the read data FB_S2 from the input terminal B; when S0=0, the multiplexer MUX outputs the read data FB_S1 from the input terminal A.

The clock signal DCLK is coupled to the clock terminal CK of the edge trigger DFF2. The edge trigger DFF2 is provided to sample the read data from the multiplexer MUX and output the sampled read data DQ_S2.

Referring to FIG. 5, a delay $T_{m1}$ of the clock signal FB_CLK relative to the clock signal INV_CLK is: $T_{m1}$=Tpat_out+Tpad_in, and a delay $T_{m2}$ of the sampling clock DQS' of the read data DQ_S1 relative to the clock signal INV_CLK is: $T_{m2}$=Tpat_out+Tac+Tpad_in. Tpat_out is an output delay of the IO port, which is 4.5 ns at the maximum working temperature and is 2.5 ns at the minimum working temperature. Tac is an accessing time of the DDR memory, which is 5 ns at the maximum working temperature and is 2 ns at the minimum working temperature. Tpat_in is an input delay of the IO port, which is 2.5 ns at the maximum working temperature and is 1.5 ns at the minimum working temperature.

It is assumed that the clock frequency of the clock signal DCLK is 166 MHz, a delay of the clock signal FB_CLK relative to the clock signal DCLK is 7 ns at the minimum working temperature and is 10 ns at the maximum working temperature. The edge trigger DFF5 samples the clock signal FB_CLK according to the clock signal DCLK. When the delay of the clock signal FB_CLK relative to the clock signal DCLK is less than 9 ns, the edge trigger DFF5 outputs a low level as the control signal MUX_SEL, and the multiplexer outputs the read data FB_S1. When the delay of the clock signal FB_CLK relative to the clock signal DCLK is larger than 9 ns, the edge trigger DFF5 outputs a high level as the control signal MUX_SEL, and the multiplexer outputs the read data FB_S2. In other words, the multiplexer MUX outputs the read data FB_S2 in the higher working temperature and outputs the read data FB_S1 in the lower working temperature.

Figure 3A:
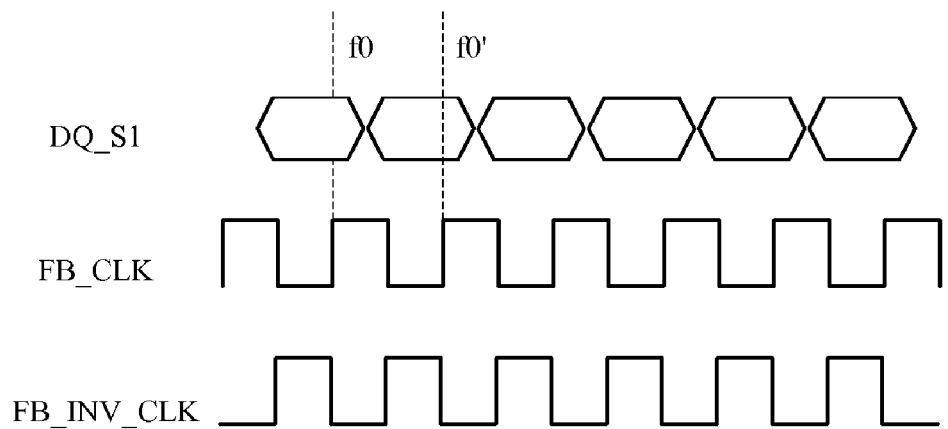
FIG. 3A is a timing diagram schematically showing sampling operations of edge triggers DFF31 and DFF32 shown in FIG. 2.
Figure 3B:
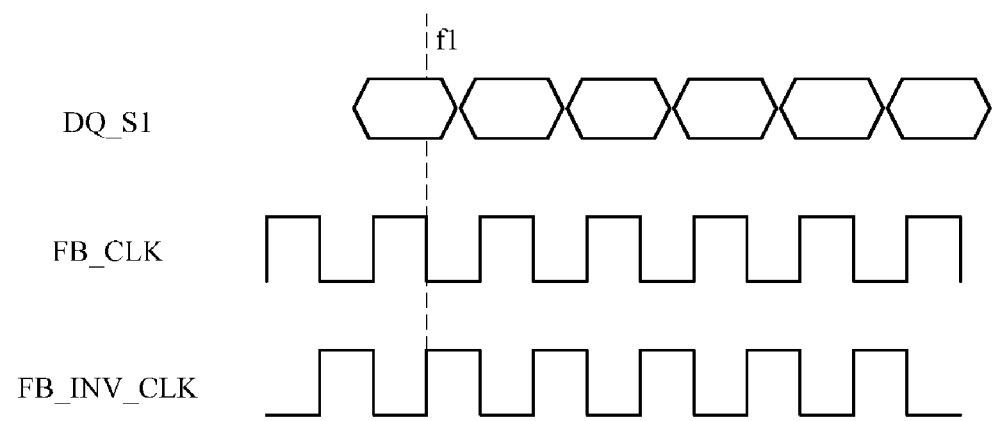
FIG. 3B is a timing diagram schematically showing a sampling operation of an edge trigger DFF4 shown in FIG. 2.

Referring to FIG. 3A, a delay of the read data DQ_S1 relative to the clock signal FB_CLK is 2 ns (less than a clock cycle T) at the minimum working temperature, the edge trigger DFF31 samples the read data DQ_S1 at the sampling point f0 according to the clock signal FB_CLK, and the edge trigger DFF32 samples the outputted data of the edge trigger DFF31 at the sampling point f0' according to the clock signal FB_CLK. Referring to FIG. 3B, a delay of the read data DQ_S1 relative to the clock signal FB_INV_CLK is larger than 3 ns (larger than 0.5T and less than 1.5T) at the maximum working temperature, the edge trigger DFF4 samples the read data DQ_S1 at the sampling point f1 according to the clock signal FB_INV_CLK.

The clock signal FB_INV_CLK at the maximum working temperature delays one more clock cycle T (the inverting delay $T_{INV}$ 0.5T, more delay of Tpat_out+Tpad_in 0.5T) than the clock signal FB_CLK at the minimum working temperature. The data FB_S1 is delayed by one clock cycle T because the data sampled by the clock signal FB_CLK is sampled again by the edge trigger DFF32. Thereby, the read data FB_S1 at the minimum working temperature and the read data FB_S2 at the maximum working temperature may be outputted to the edge trigger DFF2 almost simultaneously.

At the minimum working temperature, the delay of the read data DQ_S2 relative to the clock signal DCLK is: $T_{m1}$+0.5T+2T=4 ns+3 ns+12 ns=19 ns. At the maximum working temperature, the delay of the read data DQ_S2 relative to the clock signal DCLK is: $T_{m1}$+0.5T+1.5T=7 ns+3 ns+9 ns=19 ns. Thus, the edge trigger DFF2 samples the read data in a common sampling cycle (18 ns to 24 ns) in all temperature range.

To ensure that the edge trigger DFF2 samples the read data in the common sampling cycle in all temperature range, the following equations should be satisfied:

$$m*T<DL_{l1}<(m+1)*T;$$

$$m*T+DL_r<DL_{h1}<DL_r+(m+1)*T;$$

$$DL_l=DL_{l2}+(m+2)*T;$$

$$DL_h=DL_{h2}+(m+1)*T+DL_r,$$

where m is a natural number, T is a clock cycle, $DL_{l1}$ is a delay of the read data DQ_S1 relative to the sampling clock of the edge trigger DFF31 at the minimum temperature, $DL_{h1}$ is a delay of the read data DQ_S1 relative to the sampling clock of the edge trigger DFF31 at the maximum temperature, $DL_r$ is a delay of the sampling clock of the edge trigger DFF4 relative to the sampling clock of the edge trigger DFF31, $DL_l$ is a delay of the input data of the edge trigger DFF5 relative to the sampling clock of the edge trigger DFF5 at the minimum temperature, $DL_h$ is a delay of the input data of the edge trigger DFF5 relative to the sampling clock of the edge trigger DFF5 at the maximum temperature, $DL_{l2}$ is a delay of the sampling clock of the edge trigger DFF4 relative to the clock signal DCLK at the minimum temperature, $DL_{h2}$ is a delay of the sampling clock of the edge trigger DFF4 relative to the clock signal DCLK at the maximum temperature.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

What is claimed is:

1. A memory controller comprising:
   a first sampling unit provided for sampling read data from a memory according to a data strobe from the memory;
   a second sampling unit provided for sampling the read data from the first sampling unit according to a first clock signal;
   a third sampling unit provided for sampling the read data from the first sampling unit according to a clock signal inverted with the first clock signal;
   a multiplexer provided for outputting one of read data from the second sampling unit and read data from the third sampling unit according to a selecting signal;
   a fourth sampling unit for sampling the first clock signal according to a second clock signal and providing the selecting signal; and
   a fifth sampling unit for sampling read data outputted from the multiplexer according to the second clock; wherein the first clock signal is provided from a clock terminal of the memory.

2. The memory controller according to claim 1, wherein the sampling units are edge triggers.

3. The memory controller according to claim 1, wherein the edge triggers are D flip-flops.

4. The memory controller according to claim 1, wherein a clock frequency of the memory controller is 166 MHz.

5. The memory controller according to claim 1, wherein the memory is a DDR SDRAM.

6. The memory controller according to claim 1, wherein the second clock is an internal clock of the memory controller.

7. The memory controller according to claim 1, wherein the second sampling unit comprises a pair of edge triggers connected in series.

8. The memory controller according to claim 1, further comprising a plurality of IO ports interacting with the memory.

9. A memory controller comprising:
   a first sampling unit having an input terminal, an output terminal and a clock terminal coupled to a first clock signal;
   a second sampling unit having an input terminal coupled to the output terminal of the first sampling unit, an output terminal and a clock terminal coupled to the first clock signal;
   a third sampling unit having an input terminal coupled to the output terminal of the first sampling unit, an output terminal and a clock terminal coupled to a clock signal inverted with the first clock signal;
   a multiplexer having two input terminals coupled to the output terminal of the second sampling unit and the output terminal of the third sampling unit respectively, a control terminal and an output terminal; and
   a fourth sampling unit having an input terminal coupled to the first clock signal, an output terminal coupled to the control terminal and a clock terminal coupled to a second clock signal, wherein the first clock signal is inputted from a clock terminal of the memory and the second clock signal is an internal clock of the memory controller.

10. The memory controller according to claim 9, wherein the sampling units are D flip-flops.

11. The memory system according to claim 9, wherein a clock frequency of the memory controller is 166 MHz.

12. A memory controller comprising:
a first sampling unit provided for sampling read data from a memory according to a data strobe from the memory;
a second sampling unit provided for sampling read data outputted from the first sampling unit according to a first clock signal;
a third sampling unit provided for sampling read data outputted from the first sampling unit according to a second clock signal;
a multiplexer provided for outputting one of read data outputted from the second sampling unit and read data outputted from the third sampling unit according to a selecting signal;
a fourth sampling unit for sampling the first clock signal according to a third clock signal and output the selecting signal; and
a fifth sampling unit for sampling read data outputted from the multiplexer according to the third clock.

13. The memory controller according to claim 12, wherein following equations are satisfied:

$$m*T < DL_{l1} < (m+1)*T;$$

$$m*T + DL_r < DL_{h1} < DL_r + (m+1)*T;$$

$$DL_l = DL_{l2} + (m+2)*T;$$

$$DL_h = DL_{h2} + (m+1)*T + DL_r,$$

wherein m is a natural number, T is a clock cycle, $DL_{l1}$ and $DL_{h1}$ are delays of the read data from the first sampling unit relative to the first clock signal at a minimum temperature and a maximum temperature respectively, $DL_r$ is a delay of the second clock signal relative to the first clock signal, $DL_l$ and $DL_h$ are delays of the first clock signal relative to the third clock signal at the minimum temperature and the maximum temperature respectively, and $DL_{l2}$ and $DL_{h2}$ are delays of the second clock signal relative to the third clock signal at the minimum temperature and the maximum temperature respectively.

14. The memory system according to claim 12, wherein the sampling units are D flip-flops.

15. The memory system according to claim 12, wherein all clock signals are substantially close to 166 MHz.

16. The memory system according to claim 12, wherein the second sampling unit comprises a pair of edge triggers connected in series.

* * * * *